(12) United States Patent
Bronstein et al.

(10) Patent No.: US 7,393,110 B2
(45) Date of Patent: Jul. 1, 2008

(54) MEDIA PROJECTOR SYSTEM

(75) Inventors: Kenneth H. Bronstein, Corvallis, OR (US); Frederick D. Taft, Corvallis, OR (US); David H. Ochs, Corvallis, OR (US); Bruce A. Stephens, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 588 days.

(21) Appl. No.: 10/885,440

(22) Filed: Jul. 6, 2004

(65) Prior Publication Data

US 2006/0007792 A1    Jan. 12, 2006

(51) Int. Cl.
*G03B 21/14*    (2006.01)

(52) U.S. Cl. .................... 353/85; 353/122; 353/121

(58) Field of Classification Search ........... 353/121, 353/15, 19, 85, 122; 348/794, 462, 738; 386/125, 126; 352/25, 26, 28, 32; 369/53.45
See application file for complete search history.

(56) References Cited

U.S. PATENT DOCUMENTS

| | | | |
|---|---|---|---|
| 4,991,025 A | 2/1991 | Eigeldinger et al. | |
| 5,623,286 A | 4/1997 | Morimoto et al. | |
| 5,815,219 A | 9/1998 | Okuizumi | |
| 5,815,631 A | 9/1998 | Sugyama et al. | |
| 5,847,748 A | 12/1998 | Laughlin | |
| 6,347,186 B2 | 2/2002 | Watanabe | |
| 6,349,077 B1 | 2/2002 | Smelt | |
| 6,418,273 B1 | 7/2002 | Lubinski et al. | |
| 6,519,408 B2 | 2/2003 | Nagata et al. | |
| 6,522,419 B1 | 2/2003 | Ko | |
| 6,549,503 B2 | 4/2003 | Matos | |
| 6,626,543 B2 | 9/2003 | Derryberry | |
| 2002/0105624 A1 | 8/2002 | Quori | |
| 2002/0175915 A1 | 11/2002 | Lichtfuss | |
| 2003/0065806 A1 | 4/2003 | Thomason et al. | |
| 2004/0001163 A1 | 1/2004 | Park | |
| 2004/0017548 A1* | 1/2004 | Denmeade | 353/31 |
| 2004/0017996 A1 | 1/2004 | Yamaguchi | |
| 2005/0052446 A1* | 3/2005 | Plut | 345/211 |

FOREIGN PATENT DOCUMENTS

| | | | |
|---|---|---|---|
| EP | 0560125 | | 9/1993 |
| EP | 0 875 818 A2 | * | 4/1998 |
| EP | 1 076 454 | | 2/2001 |
| EP | 1 187 437 | | 3/2002 |
| JP | 2000-69397 | | 3/2000 |
| JP | 2000/358207 A | | 12/2000 |
| JP | 2001133880 A | * | 5/2001 |
| JP | 2001/285740 A | | 10/2001 |

OTHER PUBLICATIONS

Translation of JP 2001133880A Translated by the JPO on Mar. 19, 2007.*
Dan Johnson, "Readers to the rescue/graphics and sound/audio DJ", vnunet.com, Apr. 29, 2004, pp. 1-2.

* cited by examiner

*Primary Examiner*—Andrew T Sever

(57) ABSTRACT

A system comprising a media player configured to play media content, a projector operatively coupled to the media player and comprising a lamp, and a control unit operatively coupled to the media player and the projector is provided. The control unit is configured to determine whether the media content comprises visual content, and the control unit is configured to prevent the lamp from being turned on in response to determining that the media content does not comprise visual content.

37 Claims, 5 Drawing Sheets

MEDIA PROJECTOR SYSTEM

BACKGROUND

Digital projector systems that are configured to display images on a screen typically include a relatively high-power lamp. The lamp serves as a light source that is modulated to project the images onto the screen. Often the lamp is turned on some time before the projector begins displaying images to allow the lamp to reach its full power output. Unfortunately, projector lamps are often expensive and wear out over time. The lifespan of a typically projector lamp may be shortened each time the lamp is turned on. A user of a digital projector may seek to maximum the lifespan of a lamp in a projector.

It would be desirable to be able to minimize the number of times that the lamp of a digital projector is turned on in order to maximum the lifespan of the lamp.

SUMMARY

One form of the present invention provides a system comprising a media player configured to play media content, a projector operatively coupled to the media player and comprising a lamp, and a control unit operatively coupled to the media player and the projector. The control unit is configured to determine whether the media content comprises visual content, and the control unit is configured to prevent the lamp from being turned on in response to determining that the media content does not comprise visual content.

DETAILED DESCRIPTION

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
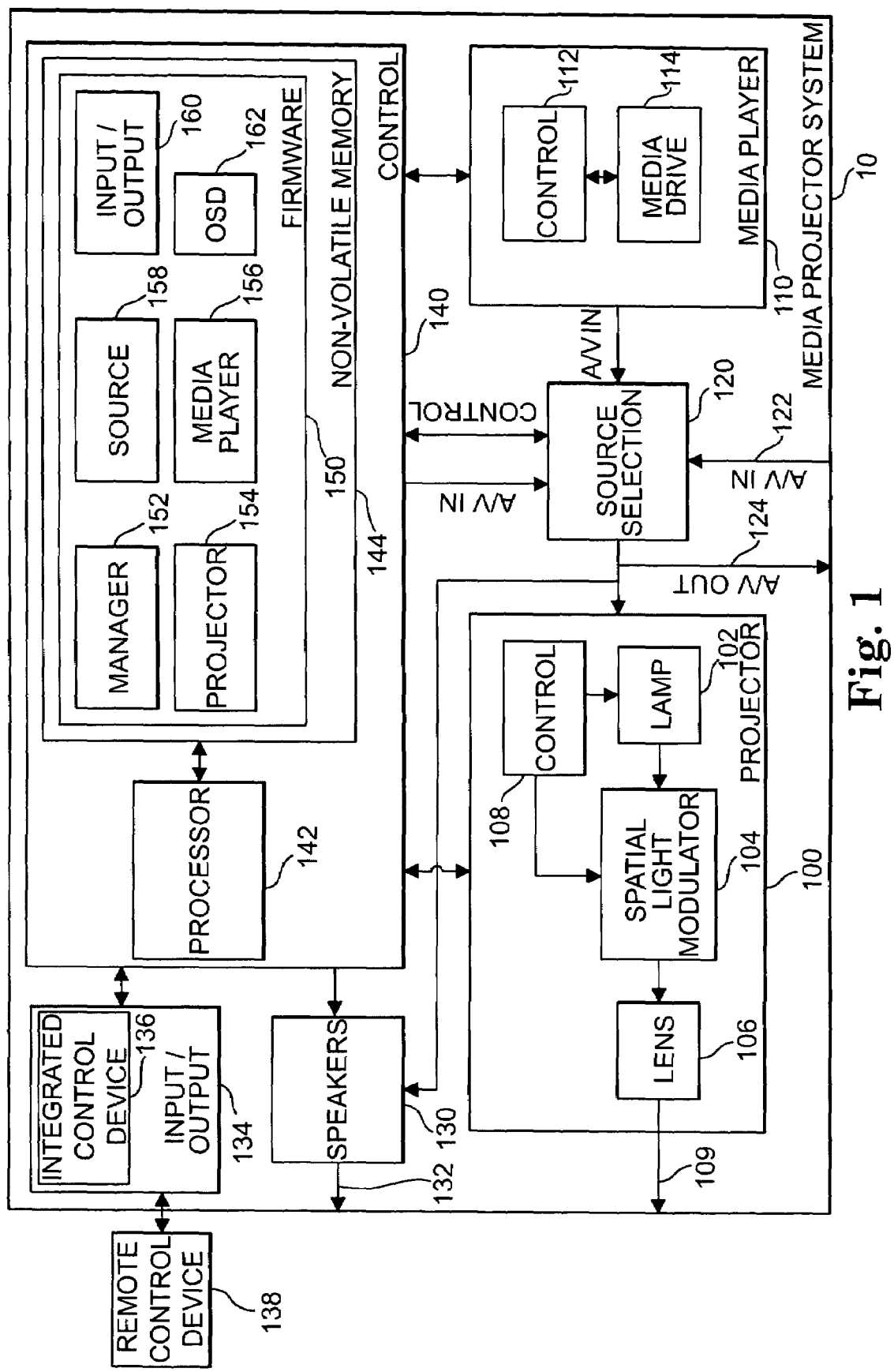
FIG. 1 is a block diagram illustrating a media projector system according to one embodiment of the present invention.

FIG. 1 is a block diagram illustrating a media projector system 10 according to one embodiment of the present invention. Media projector system 10 comprises a projector 100, a media player 110, a source selection unit 120, one or more speakers 130, an input/output unit 134, and a control unit 140. Media projection system 10, including projector 100, media player 110, source selection unit 120, speakers 130, input/output unit 134, and control unit 140, is enclosed within a housing (not shown).

Projector 100 comprises a lamp 102, a spatial light modulator 104, a lens 106, and a control unit 108. Projector 100 receives a video signal from source selection unit 120 and causes images to be displayed on a screen or other surface in response to the video signal using lamp 102, spatial light modulator 104, lens 106, and control unit 108 as indicated by an arrow 109. More specifically, lamp 102 provides a light source to spatial light modulator 104. Spatial light modulator 104 reflects selected portions of the light source through lens 106 in response to the video signal to cause images to be projected onto a screen or other surface. Control unit 108 controls the operation of lamp 102 and spatial light modulator 104. Lamp 102 may be a mercury ultra high pressure, xenon, metal halide, or other suitable projector lamp.

Figure 2A:
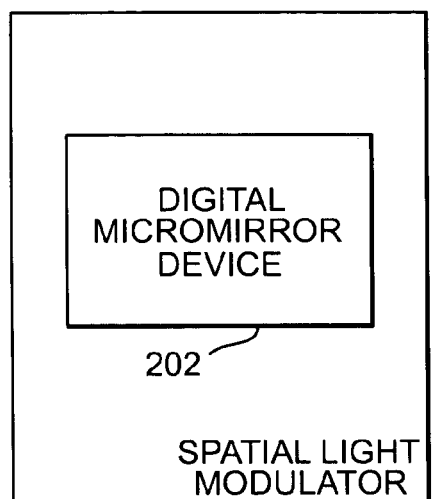
FIG. 2A is a block diagram illustrating a spatial light modulator according to one embodiment of the present invention.
Figure 2B:
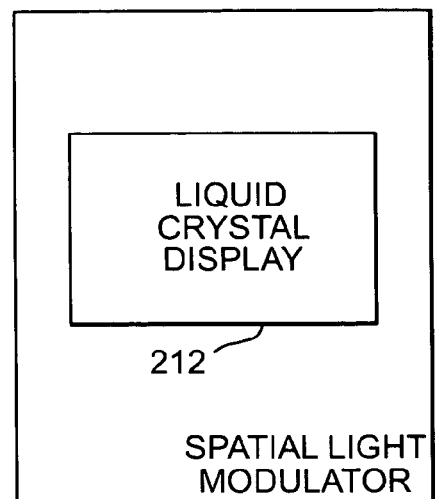
FIG. 2B is a block diagram illustrating a spatial light modulator according to one embodiment of the present invention.

As shown in FIGS. 2A and 2B, spatial light modulator 104 may comprise a digital micromirror device (DMD) or a liquid crystal display (LCD) device. FIG. 2A is a block diagram illustrating spatial light modulator 104A according to one embodiment of the present invention. FIG. 2B is a block diagram illustrating selected portions of spatial light modulator 104B according to another embodiment of the present invention. Projector 100 may comprise spatial light modulator 104A, spatial light modulator 104B, or another suitable spatial light modulator.

In the embodiment shown in FIG. 2A, spatial light modulator 104A comprises a digital micromirror device (DMD) 202. DMD 202 comprises a plurality of microscopic mirrors that are each configured to reflect or not reflect light from lamp 102. The reflected light is directed through lens 104 to form an image on a screen or other surface located remotely from projector 100.

In the embodiment shown in FIG. 2B, spatial light modulator 104B comprises a liquid crystal display (LCD) 212. LCD 212 comprises a plurality of liquid crystals configured to each transmit or block light from lamp 102. The transmitted light is directed through lens 104 to form an image on a screen or other surface located remotely from projector 100.

Projector 100 receives control signals from control unit 140 using control unit 108. Projector 100 provides information to control unit 140 using control unit 108. Control unit 108 provides control signals to lamp 102 and spatial light modulator 104. For example, control unit 108 is configured to cause lamp 102 to be turned on and off and cause power to be provided to spatial light modulator 104. Control unit 108 is also configured to detect error conditions associated with lamp 102 and spatial light modulator 104 and report error conditions to control unit 140.

Media player 110 comprises a control unit 112 and a media drive 114. Media player 110 provides media content, e.g., audio and/or visual content, from a disc or other media to projector 100 and/or speakers 130 using source selection unit 120. Media drive 114 receives one or more discs or other media inserted by a user of media projector system 10. A disc may comprise a digital video disc (DVD), a compact disc (CD) (e.g., CD-ROM, CD-R, CD-RW, and CD+RW), or other disc configured to store audio and/or visual content. The audio and/or visual content may be in various formats such as DVD, CD audio, MP3, JPEG, QuickTime, RealAudio, RealVideo, and Windows Media. Media drive 114 reads the audio and/or visual content from a disc and provides the audio and/or visual content to projector 100 and/or speakers 130 through source selection unit 120.

Media player 110 receives control signals from control unit 140 using control unit 112. Media player 110 provides information to control unit 140 using control unit 112. Control unit 108 provides control signals to media drive 114.

Source selection unit 120 receives audio/video input (A/V IN) signals from media player 110, control unit 140, and an external source (indicated by an arrow 122). Source selection unit 120 provides an audio/video output (A/V OUT) to projector 100, speakers 130, and an A/V port (indicated by an arrow 124). More specifically, source selection unit 120 selects the audio/video input from media player 110, control unit 140, or the external source in response to control signals from control unit 140. Source selection unit 120 provides the selected audio/video input as the audio/video output to projector 100, speakers 130, and the A/V port. Source selection unit 120 may be configured to selectively provide the audio/video output to projector 100, speakers 130, or the A/V port.

Speakers 130 receive audio inputs from source selection unit 120 and generate audible sounds in response to the audio inputs as indicated by an arrow 132. Speakers 130 may include audio processing to modify the audio inputs for amplification by speakers 130. Speakers 130 receive control signals from control unit 140.

Input/output (I/O) unit 134 comprises one or more integrated control devices 136 and one or more ports configured to allow an external device (not shown) or a user to communicate with media projector system 10. The ports may include an infrared (IR) port configured to provide signals from a remote control device 138 for media projector unit 10 and any other suitable ports for transferring information to and/or from an external device. The integrated control devices 136 may include keypads, buttons, dials, LEDs, and any other suitable I/O devices for receiving information from and/or providing information to the user.

Control unit 140 comprises a processor 142 and a non-volatile memory 144, e.g., a flash memory. Non-volatile memory 144 comprises firmware 150 which comprises a manager module 152, a projector module 154, a media player module 156, a source module 158, an input/output module 160, and on-screen display (OSD) information 162. Firmware 150 and each module 152, 154, 156, 158, and 160 comprise instructions that are executable by processor 142 for causing functions to be performed control unit 140. On-screen display (OSD) information 162 comprises audio and/or visual content suitable for being played by speakers 130 and/or displayed by projector 100.

Control unit 140 generates control signals for controlling projector 100, media player 110, source selection unit 120, speakers 130, and I/O unit 134 in response to processor 142 executing instructions from firmware 150. More specifically, processor 142 executes manager module 152 to control the overall operation of media projector system 10 using projector module 154, media player module 156, source module 158, and input/output module 160. In addition, processor 142 executes projector module 154, media player module 156, source module 158, and input/output module 160 to control the operation of projector 100, media player 110, source selection unit 120, and I/O unit 134, respectively.

In other embodiments, control unit 140 may comprise other combinations of hardware and/or software components configured to perform the functions just described. Non-volatile memory 144 comprises one type of medium configured to store firmware 150 such that the instructions in firmware 150 may be accessed and executed by processor 142. In other embodiments, firmware 150 may be stored on other type of portable or non-portable media.

In operation, lamp 102 of projector 100 may wear out over time. In an attempt to minimize the use of lamp 102, media projector system 10 may operate lamp 102 such that lamp 102 is turned on or struck only in response to detecting visual content on a disc in media player 110. The visual content may include video content and still or streaming image content. If a disc does not include visual content or includes only audio content, media projector system 10 ensures that lamp 102 is not turned on in response to the audio content being played.

Figure 3:
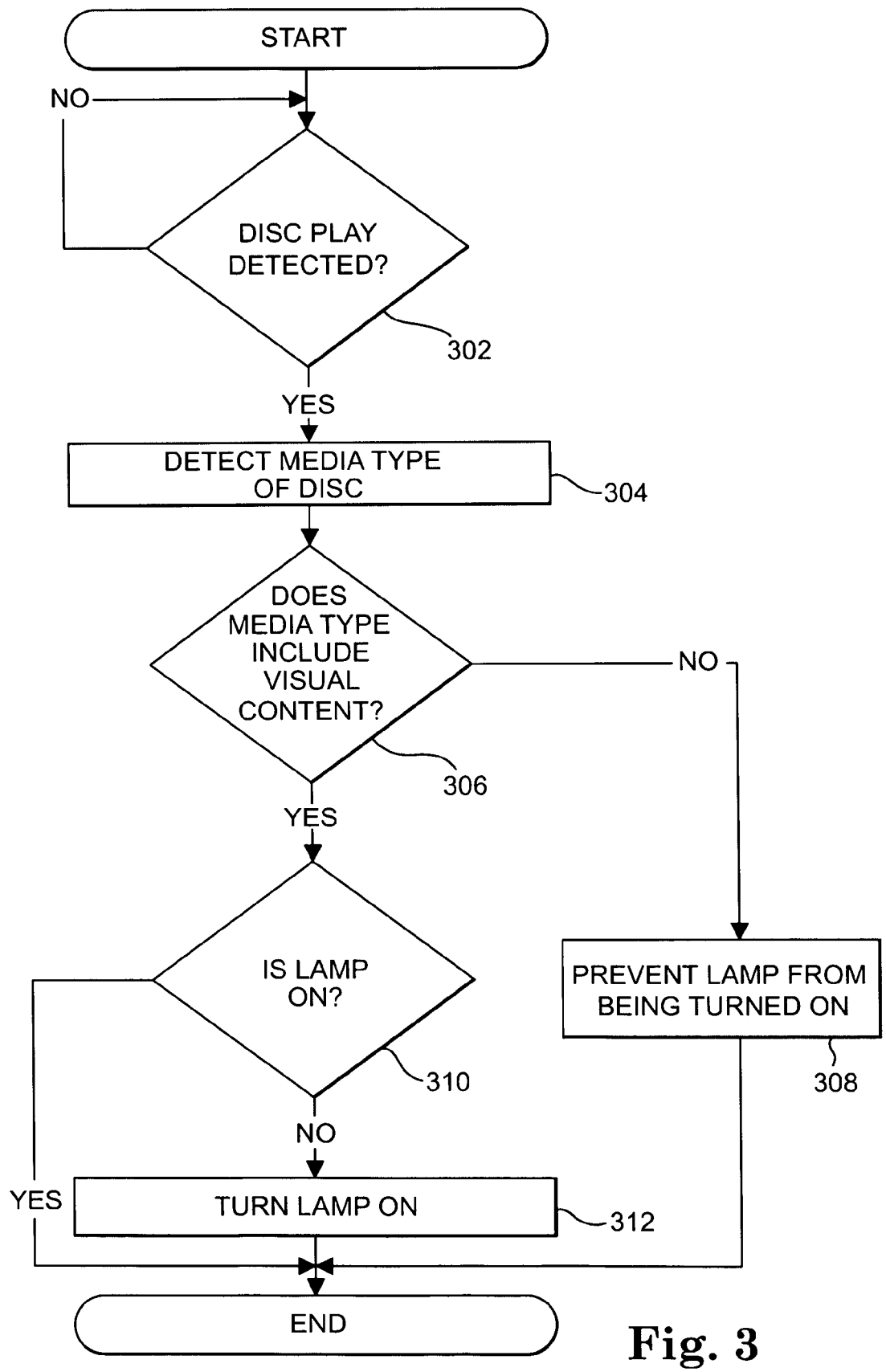
FIG. 3 is a flow chart illustrating a method for lamp management in a media projector system according to one embodiment of the present invention.

FIG. 3 is a flow chart illustrating a method for lamp management in a media projector system according to one embodiment of the present invention. In FIG. 3, a determination is made by media projector system 10 as to whether a disc play state has been detected as indicated in a block 302. The disc play state indicates that the disc in media drive 114 is to be played by media player 110 to cause the audio and/or visual content of the disc to be provided from media player 110 to projector 100 and/or speakers 130. The disc play state may be initiated in response to any number of conditions. For example, the disc play state may be initiated in response to the disc being inserted into media drive 114. The disc play state may also be initiated in response to a user input from I/O unit 134 that requests that the disc in media player 110 be played.

If a disc play state has not been detected, then media projector system 10 repeats the function of block 302 at a later time. If a disc play state has been detected, then media projector system 10 detects a media type of a disc in media drive 114 as indicated in a block 304. A determination is made by media projector system 10 as to whether the media type includes visual content as indicated in a block 306. If the media type does not include visual content, then media projector system 10 prevents lamp 102 from being turned on as indicated in a block 308. If lamp 102 is on prior to the determination of block 306, then media projector system 10 may leave lamp 102 on.

If the media type includes visual content, then a determination is made by media projector system 10 as to whether lamp 102 is on as indicated in a block 310. If lamp 102 is on, then the method ends as indicated. If lamp 102 is not on, then media projector system 10 turns lamp 102 on as indicated in a block 312. Accordingly, any visual content of the disc may be displayed on the screen by projector 100 in response to turning on lamp 102.

The internal operation of media projector system 10 in turning on lamp 102 in response to a disc including visual content will now be described according to one embodiment. In particular, the operation of media player 110 will be described with respect FIGS. 4 and 5, and the operation of control unit 140 will be described with respect FIG. 6.

Figure 4:
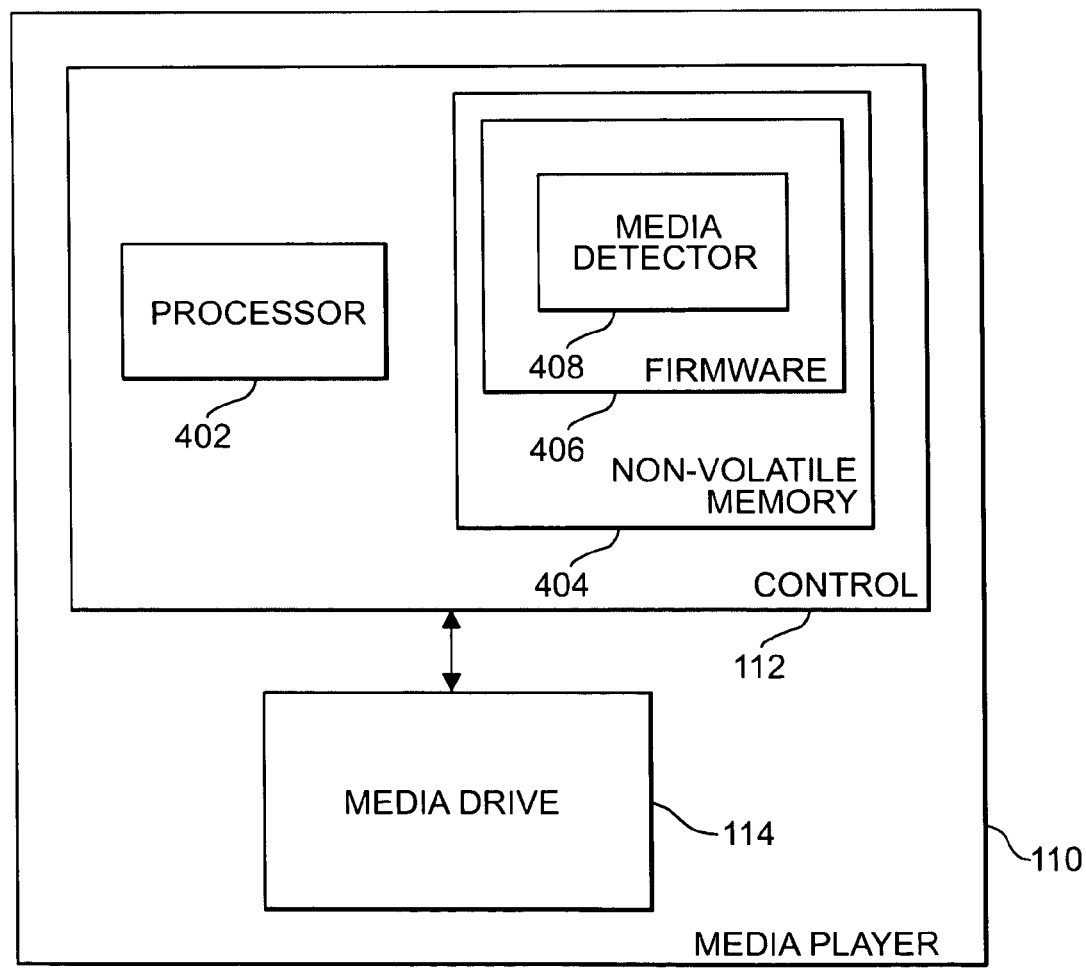
FIG. 4 is a block diagram illustrating selected portions of a media player according to one embodiment of the present invention.

FIG. 4 is a block diagram illustrating selected portions of media player 110 according to one embodiment of the present invention. In the embodiment shown in FIG. 4, control unit 112 comprises a processor 402 and a non-volatile memory 404. Non-volatile memory 404 comprises firmware 406 which comprises a media detector module 408. Firmware 406 and media detector module 408 each comprise instructions that are executable by processor 402 for causing functions to be performed by media player 110.

Figure 5:
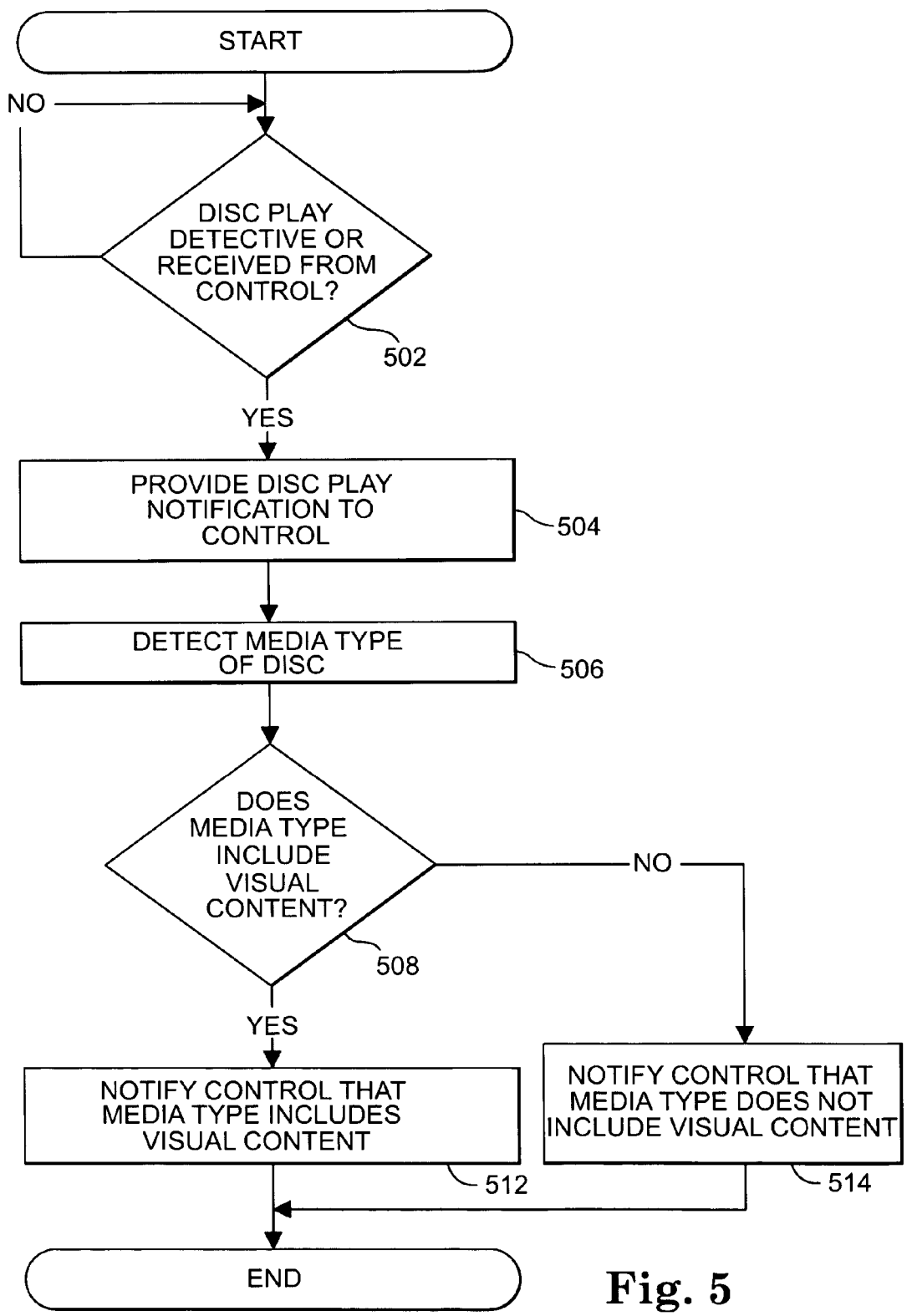
FIG. 5 is a flow chart illustrating a method for detecting a media type according to one embodiment of the present invention.

FIG. 5 is a flow chart illustrating a method detecting a media type according to one embodiment of the present invention. In FIG. 5, a determination is made by media player 110 as to whether a disc play state has been detected by control unit 112 or received from control unit 140 as indicated in a block 502. Control unit 112 detects a disc play state in response to detecting that a user has inserted a disc into media drive 114. Control unit 112 also detects a disc play state in response to receiving a notification from control unit 140 that a disc play state has been initiated, e.g., by a user pressing a play button on an integrated control device 136 or remote control device 138.

If a disc play state has not been detected or received, then media player 110 repeats the function of block 502 at a later time. If a disc play state has been detected or received, then media player 110 provides a disc play notification to control unit 140 as indicated in a block 504. Media player 110 may provide the disc play notification in response to detecting that a disc has been inserted into media drive 114. If media player 110 receives a notification from control unit 140 that a disc play state has been initiated, then media player 110 may omit the function shown in block 504.

Media player 110 detects a media type of a disc in media drive 114 as indicated in a block 506. More specifically, media player 110 causes media detector module 408 to be executed by processor 402 to determine whether a disc in media drive 114 contains visual content. Media detector module 408 makes this determination by causing information to be read from the disc to determine a type of content of the disc. The information may expressly identify the type of content or media detector module 408 may deduce the type of content from the information. A determination is made by media player 110 as to whether the media type includes visual content as indicated in a block 508.

If the media type includes visual content, then media player 110 notifies control block 140 that the media type includes video as indicated in a block 512. More specifically, firmware 406 causes control unit 112 to notify control unit 140 as to whether the disc in media drive 114 contains visual content as determined by media detector module 408.

If the media type does not include visual content, then media player 110 notifies control block 140 that the media type does not include video as indicated in a block 514. Accordingly, media player 110 detects whether a disc in media player 110 includes visual content and notifies control unit 140 to cause control unit 140 to turn on lamp 102 if the disc includes visual content.

In other embodiments, control unit 112 may comprise other combinations of hardware and/or software components configured to perform the functions just described including the functions performed by media detector module 408. Nonvolatile memory 404 comprises one type of medium configured to store firmware 406 such that the instructions in firmware 406 may be accessed and executed by processor 402. In other embodiments, firmware 406 may be stored on other type of portable or non-portable media.

Figure 6:
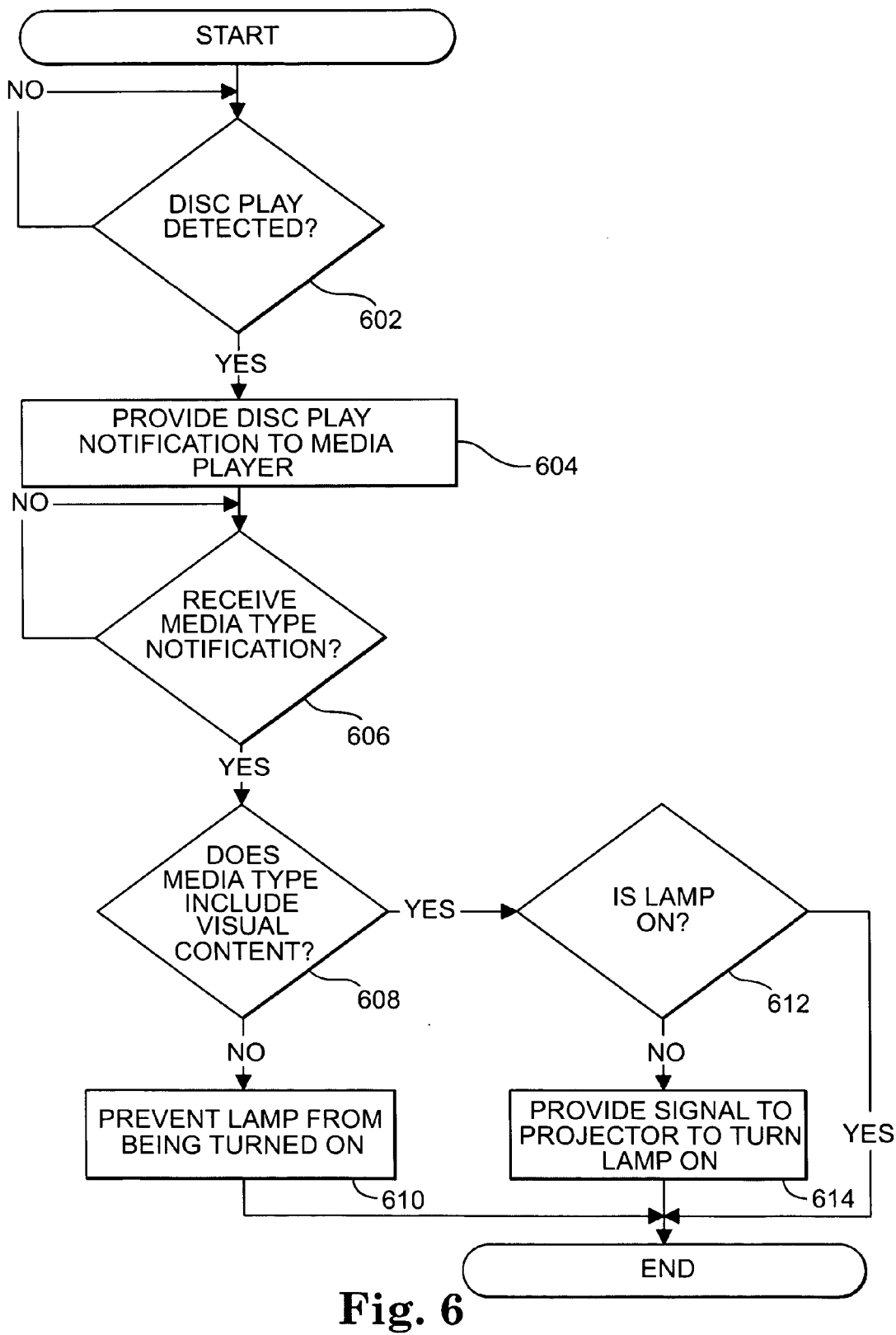
FIG. 6 is a flow chart illustrating a method for turning on a lamp in response to a media type according to one embodiment of the present invention.

FIG. 6 is a flow chart illustrating a method for turning on a lamp in response to a media type using control unit 140 according to one embodiment of the present invention. In FIG. 6, a determination is made by control unit 140 as to whether a disc play state has been detected as indicated in a block 602. Control unit 140 detects a disc play state in response to input/output module 160 detecting a user input from I/O unit 134 that requests that the disc in media player 110 be played, e.g., by a user pressing a play button on an integrated control device 136 or remote control device 138. Input/output module 160 provides a notification to manager module 152 in response to detecting a disc play state. Control unit 140 also detects a disc play state in response to media player module 156 receiving a disc play notification from media player 110 where a user has inserted a disc into media drive 114. Media player module 156 provides a notification to manager module 152 in response to detecting a disc play state.

If a disc play state has not been detected, then control unit 140 repeats the function of block 602 at a later time. If a disc play state has been detected, then control unit 140 causes a disc play notification to be provided to media player 110 as indicated in a block 604. Control unit 140 may provide the disc play notification to media player 110 in response to detecting a user input from I/O unit 134 that requests that the disc in media player 110 be played. In response to receiving a notification associated with a disc play state from input/output module 160, manager module 152 causes media player module 156 to provide the disc play notification to media player 110. If manager module 152 receives a notification from media player module 156 that a disc play state has been initiated (e.g, by a disc being inserted in media drive 114), then manager module 152 may cause the function shown in block 604 to be omitted.

A determination is made by control unit 140 as to whether a media type notification has been received from media player 110 as indicated in a block 606. More specifically, manager module 152 determines whether media player module 156 has received the media type notification from media player 110. If the media type notification has not been received, then control unit 140 repeats the function of block 606 at a later time. If the media type notification has been received, then a determination is made by control unit 140 as to whether the media type includes visual content as indicated in a block 608. More specifically, manager module 152 examines the media type notification received by media player module 156 to determine whether the disc comprises visual content. If the media type does not include visual content (i.e., the media type includes audio content only), then control unit 140 prevents lamp 102 from being turned on as indicated in a block 610. In particular, manager module 152 prevents lamp 102 from being turned on by causing projector module 154 not to notify control unit 108 to turn on lamp 102. If lamp 102 is on prior to the determination of block 608, then control unit 140 causes lamp 102 to be left on. In particular, manager module 152 prevents lamp 102 from being turned off by causing projector module 154 not to notify control unit 108 to turn off lamp 102.

If the media type includes visual content, then a determination is made by control unit 140 as to whether lamp 102 is on as indicated in a block 612. Manager module 152 causes projector module 154 to determine whether lamp 102 is on. Projector module 154 may make this determination by accessing information indicating whether lamp 102 is on or by querying control unit 108.

If lamp 102 is on, then the method ends as indicated. If lamp 102 is not on, then control unit 140 provides a signal to projector 100 to cause lamp 102 to be turned on as indicated in a block 614. More specifically, manager module 152 causes projector module 154 to provide a signal to control unit 108 to cause lamp 102 to be turned on. Accordingly, control unit 140 causes lamp 102 to be turned on in response to media player 140 detecting visual content on the disc using firmware 150 to allow the visual content to be displayed on the screen by projector 100.

Embodiments described herein may provide advantages over prior solutions. For example, a lifespan of a lamp in a media projector system may be increased by turning on the lamp only in response to detecting visual content. In addition, power consumption of a media projector system may be decreased by turning on the lamp only in response to detecting visual content.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A system comprising:
   a media player configured to play media content;
   a projector operatively coupled to the media player and comprising a lamp; and
   a first control unit operatively coupled to the media player and the projector;
   wherein the first control unit is configured to determine whether the media content comprises visual content, and wherein the first control unit is configured to prevent the lamp from being turned on in response to determining that the media content does not comprise visual content.

2. The system of claim 1 wherein the media content is stored on a disc, and wherein the first control unit is configured to determine whether the disc comprises visual content in response to detecting a disc play state associated with the disc.

3. The system of claim 1 wherein the first control unit is configured to prevent the lamp from being turned on in response to determining that the media content comprises only audio content.

4. The system of claim 1 wherein the first control unit is configured to cause the lamp to be turned on in response to determining that the media content comprises visual content.

5. The system of claim 1 wherein the projector comprises a second control unit, and wherein the first control unit is configured to provide a first signal to the second control unit to cause the lamp to be turned on in response to determining that the media content comprises visual content.

6. The system of claim 5 wherein the first control unit is configured not to provide the first signal to the second control unit in response to determining that the media content does not comprise visual content.

7. The system of claim 5 wherein the media player comprises a third control unit configured to determine whether the media content comprises visual content, and wherein the third control unit is configured to provide a second signal to the first control unit to indicate whether the media content comprises visual content.

8. The system of claim 1 wherein the projector comprises a spatial light modulator.

9. The system of claim 8 wherein the spatial light modulator comprises a digital micromirror device (DMD).

10. The system of claim 8 wherein the spatial light modulator comprises a liquid crystal display (LCD) device.

11. The system of claim 1 wherein the media content comprises a digital video disc (DVD).

12. The system of claim 1 further comprising:
    a speaker operatively coupled to the media player.

13. The system of claim 1 further comprising:
    an input/output unit operatively coupled to the first control unit;
    wherein the input/output unit is configured to receive a signal from a remote control device.

14. The system of claim 1 further comprising:
    a source selection unit operatively coupled to the media player, the first control unit, and the projector;
    wherein the source selection unit is configured to provide a first signal from the media player to the projector in response to a second signal from the first control unit.

15. A method comprising:
    detecting a disc play state associated with a disc in a media player;
    determining whether the disc comprises visual content; and
    turning on a lamp of a projector operatively coupled to the media player only in response to determining that the disc comprises visual content.

16. The method of claim 15 further comprising:
    preventing the lamp of the projector from being turned on in response to determining that the disc does not comprise visual content.

17. The method of claim 15 further comprising:
    preventing the lamp of the projector from being turned on in response to determining that the disc comprises only audio content.

18. The method of claim 15 wherein the disc comprises a digital video disc (DVD).

19. The method of claim 15 further comprising:
    providing a video signal associated with the visual content from the media player to the projector in response to determining that the disc comprises visual content.

20. The method of claim 19 further comprising:
    projecting an image associated with the video signal onto a surface using a digital micromirror device (DMD).

21. The method of claim 19 further comprising:
    projecting an image associated with the video signal onto a surface using a liquid crystal display (LCD) device.

22. The method of claim 15 further comprising:
    providing an audio signal associated with the disc from the media player to a speaker in response to determining that the disc does not comprise visual content.

23. A system including a media player configured to play a disc and a projector including a spatial light modulator and a lamp and operatively coupled to the media player, the system comprising:
    means for detecting a disc play state associated with the disc;
    means for determining whether the disc comprises visual content; and
    means for preventing the lamp from being turned on in response to determining that the disc does not comprise visual content.

24. The system of claim 23 further comprising:
    means for determining whether the disc comprises visual content in response to receiving a signal from the means for detecting the disc play state associated with the disc.

25. The system of claim 23 wherein the means for determining whether the disc comprises visual content includes means for determining whether the disc comprises audio content, the system further comprising:
    means for preventing the lamp from being turned on in response to receiving a signal from the means for determining whether the disc comprises audio content.

26. The system of claim 23 further comprising:
    means for causing the lamp to be turned on in response to receiving a signal from the means for determining that the disc comprises visual content.

27. A system including a media player configured to play a disc and a projector including a spatial light modulator and a lamp and operatively coupled to the media player, the system comprising:

means for detecting a disc play state associated with the disc;

means for determining whether the disc comprises visual content; and means for turning on the lamp only in response to determining that the disc comprises visual content.

28. The system of claim 27 further comprising:

means for determining whether the disc comprises visual content in response to receiving a signal from the means for detecting the disc play state associated with the disc.

29. The system of claim 27 wherein the means for determining whether the disc comprises visual content includes means for determining whether the disc comprises audio content, the system further comprising:

means for preventing the lamp from being turned on in response to receiving a signal from the means for determining whether the disc comprises audio content.

30. A system comprising:

a media player configured to play a disc;

a projector operatively coupled to the media player and comprising a lamp; and a first control unit operatively coupled to the media player and the projector;

wherein the first control unit is configured to determine whether the disc comprises visual content, and wherein the first control unit is configured to prevent the lamp from being turned on in response to determining that the disc does not comprise visual content.

31. The system of claim 30 wherein the first control unit is configured to determine whether the disc comprises visual content in response to detecting a disc play state associated with the disc.

32. The system of claim 30 wherein the first control unit is configured to prevent the lamp from being turned on in response to determining that the disc comprises only audio content.

33. The system of claim 30 wherein the first control unit is configured to cause the lamp to be turned on in response to determining that the disc comprises visual content.

34. The system of claim 30 wherein the projector comprises a second control unit, and wherein the first control unit is configured to provide a first signal to the second control unit to cause the lamp to be turned on in response to determining that the disc comprises visual content.

35. The system of claim 34 wherein the first control unit is configured not to provide the first signal to the second control unit in response to determining that the disc does not comprise visual content.

36. The system of claim 34 wherein the media player comprises a third control unit configured to determine whether the disc comprises visual content, and wherein the third control unit is configured to provide a second signal to the first control unit to indicate whether the disc comprises visual content.

37. The system of claim 30 wherein the disc comprises a digital video disc (DVD).

\* \* \* \* \*